United States Patent Office 3,455,860
Patented July 15, 1969

3,455,860
WATER SOLUBLE FURANS
Edward S. Valentine, Berkeley, Calif., assignor to Far-Best Corporation, a corporation of California
No Drawing. Continuation-in-part of application Ser. No. 361,550, Apr. 21, 1964. This application Nov. 16, 1966, Ser. No. 594,695
Int. Cl. C08g 9/32
U.S. Cl. 260—29.4
12 Claims

ABSTRACT OF THE DISCLOSURE

Furfuryl alcohol-modified urea formaldehyde condensates are solubilized by reacting an alcohol with said condensates in the presence of a mineral acid and water until the resin begins to change color and the viscosity begins to increase, and neutralizing said condensate with an alkaline material. The solubilized condensates are used to treat cellulose fibers to increase the wet strength.

---

This application is a continuation-in-part of Ser. No. 361,550 filed April 21, 1964, now abandoned.

This invention relates in general to a novel material especially designed as a coating or impregnating material for fibrous cellulosic material, to the method of making this material, and to the resultant coated or impregnated cellulosic material. More particularly, the invention relates to a water soluble furan resin, to a method for making a solubilized furan resin, and to a paper of high wet strength which incorporates this resin.

Melamine-formaldehyde and urea-formaldehyde resins are used in the production of high wet-strength paper. In the unbleached form, this paper is used in the manufacture of such items as bags and corrugated boxes. Melamine-formaldehyde resins are conventionally used in the treatment of unbleached Kraft cellulosic fiber mats as part of the process performed by a paper machine. While expensive, they have the virtue of polymerizing sufficiently rapidly to permit full development of wet strength during the formation of the paper by means of paper machines. Where urea-formaldehyde resins are used, as in the manufacture of high wet-strength paper for toweling and tissue, aging is required to permit adequate cure of the resin.

Various other somewhat similar resins are available and are less costly but either require an extended storage time for cure or, where they polymerize sufficiently rapidly, are incapable of being solubilized or suitably dispersed in an aqueous dilute solution or suspension for addition to pulp stock used in paper making. They are not absorbed by the paper but tend to be lost with the "white water."

Furan resins generally fall into the second category. They are relatively inexpensive and polymerize sufficiently rapidly to have some apparent promise for use in imparting wet strength to paper, but these resins are not readily solubilized.

It is therefore an object of this invention to provide a method for converting a water insoluble furan to a stable water soluble form.

A further object of this invention is to provide a water soluble furan resin, the ultimate cost of which is substantially less than that of the conventional melamine-formaldehyde resins used to impart wet strength to paper but which is functionally competitive with the said melamine-formaldehyde resins for this and other uses; the resultant resins are functionally superior, especially with respect to ease of cure, to the urea-formaldehyde resins.

Other objects and advantages of this invention, if not specifically set forth, will become apparent in the course of the description which follows.

Generally, this invention concerns a process for the conversion of a water insoluble furan to a water soluble form where it will remain stable and uncured for extended periods of time, the process comprising: mixing a lower aliphatic monohydric alcohol with the resin; adding a dilute mineral acid, the acid being sufficient in quantity to reduce the pH to at least about 1.5, and preferably to at least about 1.0, but insufficiently concentrated to result in rapid curing of the resin, and the water being sufficient to dissolve the acidified resin entirely; permitting the mineral acid and the resin to react until the resin begins to change color and the viscosity begins to increase; and thereafter neutralizing or overneutralizing with an alkaline material. The resultant product is inherently stable and can be substituted, in solution form, for the melamine-formaldehyde resins commonly used in paper making with results which are essentially identical or superior, with respect to wet strength, and substantially identical with respect to rate of polymerization.

The usable furan resins are the furfuryl alcohol modified urea-formaldehyde condensates. This invention is especially applicable to the solubilization of the furfuryl alcohol modified urea-formaldehyde type resins where high wet strength paper is to be made.

An especially suitable resin is the furan resin designated SPF below, the manufacture of which is outlined below. Formaldehyde and urea are charged together in a mol ratio of 2.5 to 1.0. Between 25 and 56% furfuryl alcohol is added, based on the reactant solids of urea-formaldehyde; 25% furfuryl alcohol is preferred in the practice of this invention. Formaldehyde is added as 37% formalin or as a urea-formaldehyde concentrate. The pH is thereafter adjusted to between 4.5 and 5.0 with formic acid. The temperature of the resultant mass is raised to reflux and cooking at reflux temperature for 45 minutes to 1 hour is carried out. A suitable viscosity end point (25° C.) is 1200 to 1500 cps. For a 40% furfuryl alcohol content, the viscosity should be between 400 and 500 cps. Viscosity is measured after vacuum distilling to 75% solids. If the urea-formaldehyde concentrate is used, no distillation step is necessary. Finally, the resultant resin is neutralized to a pH of 7.25 with sodium hydroxide or sodium phosphate. The manufacture of other suitable resins of the furan type is set out in various patents and other references such as U.S. Patent 2,518,388; U.S. Patent 2,471,631; British Patent 920,236; and Australian patent application 5,000/61.

The first step in the process is the addition of at least about 36 and preferably 40 to 60 parts by weight, based on 100 parts resin solids, of methanol. Other lower aliphatic monohydric alcohols such as ethanol can be employed but more is required, i.e. at least 70 parts. Use of methanol is preferred if a resin of infinite miscibility is desired, as in paper making where 6% solutions of resins are used.

The next step in the modification of these insoluble furans is solubilization in an aqueous solution of a mineral acid of which preferred representatives are phosphoric acid, hydrochloric acid, sulfuric acid and nitric acid. As an alternative, water may be added to the resin first and the acid thereafter, but concentrated acid (in excess of 50%) should not be contacted directly with the resin or the latter will cure almost instantaneously. Most preferred is a relatively dilute hydrochloric solution such as results from mixing a 37% hydrochloric solution with six or seven times its weight of water. In this form the acid may be added directly to the resin and curing does not take place sufficiently rapidly to adversely affect the product, provided the aforementioned alcohol is already present. The quantity of acid, per 100 weight parts of the resin solids, should be at least ¾ part per hundred, based on 100% acid, and a quantity of water required is at least 25 parts and preferably ranges between 35 and 60 parts per hundred parts of resin solids by weight. The minimum quantity of methanol will depend to some extent on the amount of acid to be added and the pH of the solution after it is neutralized. With 36 parts of methanol and ¾ part of acid the polymer becomes soluble at a pH of 11.4. With 54 parts of methanol and 2 parts of acid the product becomes soluble at a pH of 5. If ethanol is employed at least 70 parts must be used with 2 parts acid and the pH must be taken to at least 11.4.

The order of addition set forth above is preferred but it is possible to admix in any order as long as the concentrated acid is not contacted directly with the resins so as to result in an undesirably rapid cure.

The acidified resin so formed is agitated until a color change is observed and the viscosity of the product begins to increase. At 70° F., this generally takes 5 to 20 minutes. Thereafter, the acidified resin is neutralized—and preferably over-neutralized. Conveniently and inexpensively this is done with 25% NaOH solution. Alternate alkaline materials are ammonium hydroxide, potassium hydroxide and virtually any of the other alkali metal or alkaline earth metal hydroxides. Since costs increase when these others are used, however, it is preferred to employ the NaOH solution first mentioned.

Examples are set forth below for illustrative purposes but these are not to be interpreted as imposing limitations on the scope of the claims other than as set forth therein.

EXAMPLE 1

A quantity of 5 parts 10% phosphoric acid solution was added to 1 part of resin SPF. The resin immediately began to polymerize and turn clear. Thereafter there was rapidly added 20 parts of an alcohol (192 proof) containing as alcoholic constituents 82% methyl alcohol and 18% isopropyl alcohol, which addition arrested the polymerization. The resin was solubilized and could be further diluted with water. The foregoing was one of a series of early tests; when the resin was permitted to be deposited upon sheets of unbleached kraft paper, a product of excellent wet strength was obtained. From an economic standpoint, the formulation was not particularly practical since the amounts of acid and ethanol were too great.

EXAMPLE 2

A quantity of 30 parts of Eronel 5437 furan resin, hereinafter called SPF2, was added to 20 parts of a 45% phosphoric acid solution. Eronel 5437 is a resin of the furfuryl alcohol modified urea-formaldehyde type having the following approximate composition by weight:

| | Percent |
|---|---|
| Urea | 10.7 |
| Formaldehyde | 13.4 |
| Furfuryl alcohol | 62.5 |

Solubilization took place almost instantaneously. Thereafter 58 parts of an aqueous solution containing 17.3% of methanol and 13.8% sodium hydroxide was added. The stability of the resultant product was not as good as in the case of several of those described in examples below; this and other tests indicated that it is desirable to add the alcohol prior to acidification. Over an extended period of time the solution became cloudy and the solids dropped out. The product would have been suitable for use in paper making or elsewhere if used within a reasonably brief period of time.

EXAMPLE 3

A quantity of 50 parts of resin SPF2 was added to 20 parts of an aqueous solution of 18.8% phosphoric acid. Solubilization took place after 3 or 4 minutes of stirring. After clarity was obtained, 20 parts of a 50% aqueous solution of methanol was added. The solution remained clear. This solution was thereafter further diluted with water to approximately a 6% resin solids solution which seemed to produce a colloidal suspension of reasonable stability. Over a period of about 12 hours the solids began to precipitate somewhat and it was concluded that the material would have been suitable only for reasonably prompt use.

EXAMPLE 4

A quantity of 20 parts of an aqueous solution of an 18.8% phosphoric acid was added to 50 parts of resin SPF2. When this mixture clarified, 20 parts of methanol was added. To this was added 110 parts of water. The sample was then split into two 100-part portions. To one 100-part portion 275 parts of water was added. These solutions were neutralized with ammonium hydroxide; the resultant samples remained clear for an extended time period.

EXAMPLE 5

The same procedure was followed as in the prior example except that after the 20 parts of the alcohol was added the resin solution was allowed to age about 10 minutes before neutralization, with the result that increased stability was observed.

EXAMPLE 6

A quantity of 20 parts of an aqueous solution of 18.8% phosphoric acid was added to 50 parts of resin SPF2. When this mixture clarified, 20 parts of methanol was stirred in. To this was added 110 parts of water. After a 15 minute delay, the solution was neutralized with ammonium hydroxide. The solution remained clear and appeared to be stable. There was no precipitation of resin and the material could be diluted in all proportions to form clear solutions. These were not, however, particularly useful in paper making as they contributed little wet strength to the stock on which they were tested. However, they were suitable products, as were several of those described in examples above, for long-term storage prior to being utilized as foundry core binders or the like as set forth in British Patent 920,236. This product also has utility as a plywood glue or in any of the other environments in which such resins are found.

EXAMPLE 7

A quantity of 55 parts of an aqueous solution of 6.85% phosphoric acid was added to 50 parts of resin SPF mixed with 40 parts of methanol. This was stirred for 10 minutes at room temperature (75° F.) The solution never became clear but appeared to be a reasonably stable suspension. This was neutralized with sodium hydroxide. This test seemed to indicate that it is necessary to use a high acidity level in order to obtain a true solution.

EXAMPLE 8

A quantity of 20 parts of an aqueous solution of 18.8% phosphoric acid was added to 50 parts of resin SPF. This was stirred in and then almost immediately 20 parts of methanol was added. This was neutralized after clarification with sodium hydroxide. A cloudy suspension was obtained.

EXAMPLE 9

A quantity of 20 parts of an aqueous solution of 37.5% phosphoric acid was added to 50 parts of resin SPF. This was stirred until a fairly clear solution was obtained which was then neutralized with sodium hydroxide. The neutralized solution remained clear overnight.

In the following examples the effect of adding alcohol before the addition of acid, a preferred procedure is seen.

EXAMPLE 10

To 50 parts of resin SPF was stirred in 20 parts of methanol. To this was added 20 parts of an aqueous solution of 21.2% phosphoric acid. This was stirred about 5 minutes when the mixture became clear. To 50 parts of this 44% solution was added 318 parts of water to make a 6% solution which remained clear. Both the 44% and the 6% solutions were further split. One set of these two solutions was neutralized with 30% sodium hydroxide. The other set of solutions was left unneutralized. The neutralized samples remained clear and stable over an extended time period. The unneutralized 44% solution remained clear and fluid overnight and begin to precipitate thereafter while the 6% unneutralized sample precipitated out overnight.

As the sodium hydroxide used for neutralizing purposes was added promptly on formation of a solubilized product, the wet strength of paper produced using this resin was only 19% of that of a standard sample produced using the customary melamine-formaldehyde resin. As subsequent experiments demonstrated, a delay between acidification and neutralization is necessary so as to permit polymerization and the formation of relatively large molecules which will deposit upon the paper and not be lost with the white water.

EXAMPLE 11

A quantity of 20 parts of methanol was added to 50 parts of resin SPF. Then 20 parts of 4.5% aqueous solution of phosphoric acid was mixed in. This was warmed to 90° F. with stirring. When solubilization occurred, the product was split into two parts. One part was neutralized with ammonium hydroxide and the other part was left unneutralized. The former remained stable.

EXAMPLE 12

A quantity of 20 parts of methanol was added to 50 parts of resin SPF. Then 20 parts of a 9.25% aqueous solution of hydrochloric acid was added. Stirring continued until clarity occurred. This sample was then neutralized with sodium hydroxide and a stable material resulted.

EXAMPLE 13

A quantity of 20 parts of methanol was added to 50 parts of resin SPF. Then 20 parts of a 1.85% aqueous solution of hydrochloric acid was stirred in. Stirring continued until the sample became clear. The sample was split into three parts. One part was neutralized with sodium hydroxide, one part was over-neutralized (pH9) with sodium hydroxide and the last part was neutralized with ammonium hydroxide. Results of making unbleached kraft hand sheets using each were as follows:

| | Percent wet strength |
|---|---|
| Sample made with resin neutralized with sodium hydroxide | 29 |
| Sample made with resin over-neutralized with sodium hydroxide | 32 |
| Sample made with resin neutralized with ammonium hydroxide | 48 |
| Sample made with melamine-formaldehyde resin (reference sheet) | 55 |
| Blank sheet containing no resin | 12 |

EXAMPLE 14

A quantity of 20 parts of methanol was added to 50 parts of resin SPF. After this was stirred in, 20 parts of 5.55% aqueous solution of hydrochloric acid was added and stirring continued until the sample clarified. This was then neutralized with sodium hydroxide to a pH of 5.0. Hand sheets of unbleached kraft were made with this resin. The wet strength was only a low 22%. However, this same sample was retested about 15 days thereafter and it was found that the wet strength of the unbleached kraft hand sheets containing this resin had increased to 45%. The dry strength of the paper increased also. This showed that the resin improved in its properties with aging. The pH had dropped to 2.5. Apparently the resin cure had not advanced sufficiently before neutralization to develop proper adsorption properties.

EXAMPLE 15

A quantity of 20 parts of methanol was added to 50 parts of resin SPF. After this was thoroughly stirred in, 20 parts of a 5.55% aqueous solution of hydrochloric acid was added and stirring continued to a point of complete clarity (approximately 12 minutes). The solution not only clarified but became quite darkened. This was then neutralized with sodium hydroxide. Unbleached kraft sheets were made with this resin. The dry strength was 140%. The wet strength was 53%. These represent very acceptable levels of dry and wet strengths. The remainder of the resin sample was further treated with sodium hydroxide to a pH of 12.0. At this pH level, the sample, which was 44% solids, could be diluted with water infinitely and the solution remained clear. This same sample, before the excess solution hydroxide was added, would form a colloidal dispersion when diluted down to 6% solids. Unbleached kraft hand sheets were made with this resin sample at a pH of 12.0. The dry strength was 142%. The wet strength was 56%. This showed the improvement in general properties to be gained by over-neutralization.

The experiments recorded above show that wet strength is tied to the degree of polymerization permitted prior to neutralization and it is also apparent that sometimes beyond bare neutralization is desirable after adequate polymerization has taken place—if the resin is to be used in the manufacture of unbleached kraft paper for paper bags, cartons and the like. These tests indicate that a 10 to 30 minute delay between acidification and neutralization (at normal room temperature) is desirable.

EXAMPLE 16

A quantity of 20 parts of 96% methanol was added to 50 parts of the 80% solids resin SPF. The two were thoroughly stirred together and three parts of a 37% HCl solution in 17 parts of water were stirred in. The resultant mixture was divided into three equal parts. Part A was permitted to stand for three minutes before neutralization to a pH of 7.5 with sodium hydroxide. Part B was permitted to stand for five minutes before being neutralized to the same pH. These samples both formed true solutions. Part C was permitted to stand for seven minutes before being neutralized to a pH of 7.5 with NaOH and a fine colloidal dispersion was obtained.

Each of parts A, B and C could be diluted with any desired quantity of water as, for example, sufficient water to provide a 6% solids solution or dispersion for use in paper making.

The use of ethyl alcohol did not permit the same virtually infinite dilutability.

Obviously, many modifications and variations of this invention may be made without departing from the spirit and scope thereof, and therefore only such limitations should be imposed as are indicated in the appended claims.

I claim:
1. The process of converting a water insoluble furan resin of the furfuryl alcohol modified urea-formaldehyde condensate type to water soluble form comprising:
   (a) mixing at least 36 parts of methanol or 70 parts of ethanol by weight with each 100 parts by weight of said resin together with sufficient of a mineral acid and water to solubilize the said resin,
   (b) permitting the said mineral acid and said resin to react until said resin begins to change color and the viscosity begins to increase, and

(c) adding sufficient alkaline material to neutralize the same.

2. The process of claim 1 wherein:
(a) the alcohol is methanol,
(b) at least 36 parts of said ethanol is used,
(c) at least ¾ part acid is used,
(d) neutralization is carried out to a pH of at least 11.4, and
(e) all parts are by weight based on 100 parts resin.

3. The process of claim 1 wherein:
(a) the alcohol is methanol,
(b) at least 54 parts of said ethanol is used,
(c) at least 2 parts acid is used,
(d) neutralization is carried out to at least pH 5, and
(e) all parts are by weight based on 100 parts resin.

4. The process of claim 1 wherein:
(a) the alcohol is ethanol,
(b) at least 70 parts of said ethanol is used,
(c) at least 2 parts acid is used,
(d) neutralization is carried out to at least 11.4, and
(e) all parts are by weight based on 100 parts resin.

5. An aqueous solution comprising a furan resin of the furfuryl alcohol modified urea-formaldehyde condensate type said solution being formed by:
(a) mixing at least 36 parts of methanol or 70 parts of ethanol by weight with each 100 parts by weight of the said resin together wtih sufficient of a mineral acid and water to solubilize the said resin,
(b) permitting the said mineral acid and said resin to react until said resin begins to change color and the viscosity begins to increase, and
(c) adding sufficient alkaline material to neutralize the same.

6. The product of claim 5 wherein:
(a) the alcohol is methanol,
(b) at least 36 parts of said methanol is used,
(c) at least ¾ part acid is used,
(d) neutralization is carried out to a pH of at least 11.4, and
(e) all parts are by weight based on 100 parts resin.

7. The product of claim 5 wherein:
(a) the alcohol is methanol,
(b) at least 54 parts of said ethanol is used,
(c) at least 2 parts acid is used,
(d) neutralization is carried out to at least pH 5, and
(e) all parts are by weight based on 100 parts resin.

8. The product of claim 5 wherein:
(a) the alcohol is ethanol,
(b) at least 70 parts of said ethanol is used,
(c) at least 2 parts acid is used,
(d) neutralization is carried out to at least 11.4, and
(e) all parts are by weight based on 100 parts resin.

9. A cellulosic product exhibiting increased wet strength comprising cellulose fibers on which have been deposited a normally water insoluble furan resin which has been converted into a water soluble form by the process of converting a water insoluble furan resin of the furfuryl alcohol modified urea-formaldehyde condensate type to water soluble form comprising:
(a) mixing at least 36 parts of methanol or 70 parts of ethanol by weight with each 100 parts by weight of the said resin together with sufficient of a mineral acid and water to solubilize the said resin,
(b) permitting the said mineral acid and said resin to react until said resin begins to change color and the viscosity begins to increase, and
(c) adding sufficient alkaline material to neutralize the same.

10. The product of claim 9 wherein:
(a) the alcohol is methanol,
(b) at least 36 parts of said ethanol is used,
(c) at least ¾ part acid is used,
(d) neutralization is carried out to a pH of at least 11.4, and
(e) all parts are by weight based on 100 parts resin.

11. The product of claim 9 wherein:
(a) the alcohol is methanol,
(b) at least 54 parts of said ethanol is used,
(c) at least 2 parts acid is used,
(d) neutralization is carried out to at least pH 5, and
(e) all parts are by weight based on 100 parts resin.

12. The product of claim 9 wherein:
(a) the alcohol is ethanol,
(b) at least 70 parts of said ethanol is used,
(c) at least 2 parts acid is used,
(d) neutralization is carried out to at least 11.4, and
(e) all parts are by weight based on 100 parts resin.

References Cited

UNITED STATES PATENTS

| | | |
|---|---|---|
| 2,510,496 | 6/1950 | Carlin. |
| 2,518,388 | 8/1950 | Simons. |
| 2,634,255 | 4/1953 | Patterson. |
| 2,750,356 | 6/1956 | Hurwitz. |
| 2,881,154 | 4/1959 | Polansky et al. |

MURRAY TILLMAN, Primary Examiner

J. C. BLEUTGE, Assistant Examiner

U.S. Cl. X.R.

117—155; 162—167; 260—33.4, 70